US008351293B2

(12) United States Patent
Frivik

(10) Patent No.: US 8,351,293 B2
(45) Date of Patent: Jan. 8, 2013

(54) MULTI-VESSEL COMMUNICATION SYSTEM

(75) Inventor: Svein Arne Frivik, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 95 days.

(21) Appl. No.: 12/706,517

(22) Filed: Feb. 16, 2010

(65) Prior Publication Data

US 2011/0199863 A1 Aug. 18, 2011

(51) Int. Cl.
*G01V 1/38* (2006.01)

(52) U.S. Cl. .......................................... 367/15; 181/110

(58) Field of Classification Search .................. 367/15, 367/20, 77; 181/108, 110
See application file for complete search history.

(56) References Cited

U.S. PATENT DOCUMENTS

| | | | |
|---|---|---|---|
| 7,184,366 B1 * | 2/2007 | Harrick et al. .................. | 367/20 |
| 7,196,969 B1 * | 3/2007 | Karazincir ..................... | 367/50 |
| 7,280,919 B2 | 10/2007 | Yomoda et al. | |
| 7,383,151 B2 * | 6/2008 | Berg et al. ....................... | 367/76 |
| 7,660,695 B2 | 2/2010 | Berg et al. | |
| 2005/0280421 A1 | 12/2005 | Yomoda et al. | |
| 2009/0141587 A1 | 6/2009 | Welker et al. | |

FOREIGN PATENT DOCUMENTS

GB 2431546 * 4/2007

OTHER PUBLICATIONS

International Search Report of PCT Application Serial No. PCT/US2011/024859 dated Aug. 31, 2011.

* cited by examiner

*Primary Examiner* — Ian Lobo

(57) ABSTRACT

A method for communicating between marine vessels includes the steps of connecting a communication hub and a first marine vessel via a cable; transmitting an electronic signal via the cable between the communication hub and the first marine vessel; and transmitting the electronic signal wirelessly between the communication hub and a second marine vessel. The cable may be a seismic cable such as, and without limitation to, a streamer and an ocean bottom cable. The seismic cable may include one or more seismic sensors such as hydrophones and geophones.

16 Claims, 2 Drawing Sheets

MULTI-VESSEL COMMUNICATION SYSTEM

TECHNICAL FIELD

The present invention relates in general to electronic communication links and networks and more specifically to marine seismic operations and communicating between vessels.

BACKGROUND

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Marine seismic exploration is widely used to locate and/or survey subterranean geological formations for hydrocarbon deposits. A survey typically involves deploying one or more seismic sources and one or more seismic sensors at predetermined locations. For example, a seismic cable including an array of seismic sensors (e.g., hydrophones, geophones, etc.) may be deployed on the sea floor or towed behind a vessel and a seismic source may be towed along the ocean's surface by a survey vessel. The seismic source generates acoustic waves that travel to the geological formations beneath the ocean floor, where they are reflected back to the seismic sensors. The seismic sensors receive the reflected waves, which are then processed to generate seismic data. Analysis of the seismic data may indicate probable locations of geological formations and hydrocarbon deposits.

Seismic surveys often use more than one survey vessel. For example, a recording vessel may be dedicated to receiving data collected by one or more survey vessels. For another example, a survey vessel, sometimes referred to as a source vessel, may be coupled to a seismic source that generates the acoustic signal. Another survey vessel, sometimes referred to as a recording boat, may be coupled to at least one seismic sensor that receives the reflected wave. For yet another example, a deployment vessel may be used to deploy the seismic cable including one or more seismic sensors, a positioning vessel may be used to position and/or re-position the deployed cables, a source vessel may be used to tow one or more seismic sources near the deployed cables, and a recording vessel may be used to record the data. Further, service vessels are often utilized to access the survey area and to service the seismic equipment.

Physically connecting the vessels, e.g. via wires and/or cables, is difficult and impractical; thus, wireless communication links, such as radio transmitters and receivers and satellite links are traditionally utilized. Drawbacks have been realized with these traditional manners of communication, in particular in regard to providing real time communication. For example, in congested seismic surveys (e.g., 3-D surveys) traditional satellite and radio communications fail due to obstructions and interference. Further, satellite communications often have time delays which preclude real time communications. The lack of real time communication may limit or preclude some operations. For example, the lack of real time communications may require that the seismic spread be reduced to an area in which real time communications can be provided. One means for addressing these drawbacks has been disclosed in U.S. Pat. No. 7,383,151 and U.S. Patent Application Publication 2008/0122716, which are incorporated herein by reference. There is a continued desire to provide communication links between vessels.

SUMMARY

One embodiment of an electronic communication system includes a first marine vessel having a controller; a communication hub; and a cable communicatively connecting the controller and the communication hub, wherein the communication hub provides a wireless communication link to a second marine vessel. The cable may be a seismic cable. The seismic cable may include one or more seismic sensors, such as and without limitation to, hydrophones and geophones. The seismic cable may be a streamer. The seismic streamer cable may be an ocean bottom cable.

The communication hub may be disposed on a buoy. In some embodiments, the buoy is connected to the cable proximate to the end that is distal from the first marine vessel. The system may include a plurality of communication hubs. The communication hubs may be in communication connection with the first marine vessel via one or more cables.

One embodiment of a method for communicating between marine vessels includes the steps of connecting a communication hub and a first marine vessel via a cable; transmitting an electronic signal via the cable between the communication hub and the first marine vessel; and transmitting the electronic signal wirelessly between the communication hub and a second marine vessel. The cable may be a seismic cable such as, and without limitation to, a streamer and an ocean bottom cable. The seismic cable may include one or more seismic sensors such as hydrophones and geophones. The seismic sensors may be in communication with the first marine vessel via the seismic cable.

The method may include the step of towing the cable from the first marine vessel. The method may include disposing the cable on the ocean bottom. In some embodiments the method includes connecting a plurality of communication hubs to the first marine vessel via one or more cables. In some embodiments the method further includes determining a best wireless signal path between the second marine vessel and the communication hub; and transmitting the electronic signal between the second marine vessel and the communication hub associated with the chosen best wireless signal path.

Another method of communication between vessels performing a marine seismic survey includes the steps of towing a plurality of streamer cables behind a first marine vessel, the first marine vessel including a controller; connecting a communication hub to the first marine vessel through at least one of the plurality of streamer cables; and transmitting an electronic signal from the first marine vessel to a second marine vessel via the communication hub. In some embodiments the step of transmitting the electronic signal from the first marine vessel to the second marine vessel comprises transmitting the electronic signal from the controller to the communication hub via the one of the plurality of streamer cables and then transmitting the electronic signal wirelessly from the communication hub to the second marine vessel. In some embodiments the method may include connecting a plurality of communication hubs and determining a best wireless path provided between the plurality of communication hubs and the second marine vessel and then transmitting the electronic signal wirelessly along the selected best wireless path.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
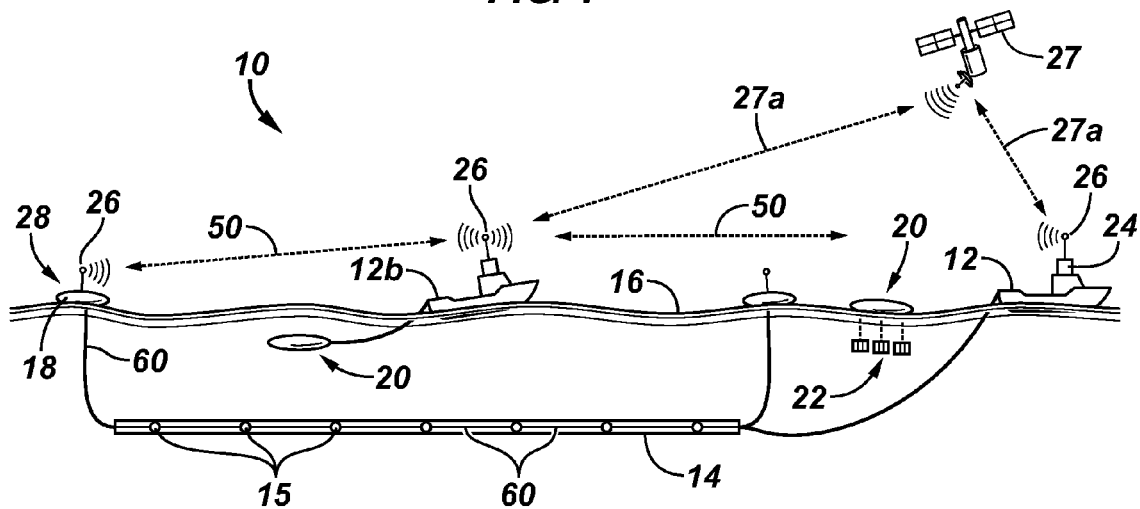
FIG. 1 is an elevation view of an exemplary embodiment of a marine seismic survey schematically illustrating a communication system according to one or more aspects of the invention.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Reference is made to ocean bottom and towed marine seismic surveys. In towed marine seismic surveys, one or several streamers are towed behind a vessel with one or more sources towed behind the same and/or another vessel. In ocean bottom systems a cable is disposed along the bottom of the water body. In some embodiments, the survey system may utilize towed streamers and ocean bottom cables. For purposes of description, streamer and cable may be used interchangeably herein. Seismic streamers may be several thousand meters long and contain a large number of sensors, which are distributed along the length of the each seismic streamer cable. Reference may be made to the in-line direction as the direction in the horizontal plane parallel to the streamer(s). A Cartesian coordinate system will also be used where the in-line direction is referred to as the x-direction. Conversely, the cross-line direction may be referred to as the direction in the horizontal plane perpendicular to the streamer (s). In the Cartesian coordinate system, the cross-line direction is referred to as the y-direction.

The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more inline (x), crossline (y) and vertical (z) components of a particle velocity and one or more components of a particle acceleration. An example of a commercial multi-component system designed for ocean-bottom (also known as seabed) applications is WesternGeco's Q-SEABED system.

Depending on the particular embodiment, the multi-component seismic sensor may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

FIG. 1 is an elevation view of a marine seismic survey (e.g., spread) conceptually illustrating a communication system in accordance with an embodiment of the invention, generally denoted by the numeral 10. The survey spread may include one or more vessels (e.g., tow vessels, chase vessels, work vessels, fast rescue craft, etc.), generally denoted by the numeral 12 and individually as 12a, 12b, etc., one or more seismic sources 20 and one or more seismic cables 14 (e.g., streamers, ocean bottom cables) having sensors 15. Some examples of marine survey systems that may be utilized in whole or in-part are disclosed in: U.S. Pat. Nos. 7,466,625; 7,426,439; 7,415,936; 7,400,552; 6,684,160; 6,604,482; 5,488,920 and 5,351,218; and U.S. Patent Application Publication Nos. 2009/0141587; 2009/0003132; 2008/0267010; 2008/0186804; 2008/0144442; 2008/0008037; 2007/0025182 and 2006/0246654; all of which are incorporated herein by reference. One type of EM surveying is referred to as controlled source EM surveying (CSEM), in which an EM transmitter (e.g., source) is used to generate EM signals, with the reflected EM signals received by the EM receivers.

Depicted in FIG. 1, a survey vessel 12, referred to herein as a master vessel, is towing a streamer 14 (e.g., umbilical) having a plurality of seismic sensors 15 (e.g., receivers, hydrophones, geophones, EM sensors, accelerometers) positioned along its length. Streamer cable 14 is submerged below the water surface 16 in this embodiment. Survey vessel 12 may carry more than one streamer 14. For example, in 3-D surveys twelve or more streamers may be towed from one or more tow vessels to cover a large survey area. These towed streamers often vary in length between three to twelve kilometers. Each streamer 14 may carry one or more buoys 18. It is common for a buoy 18, for example a tail buoy, to carry radar reflectors, navigation equipment, and acoustic transponders.

The depicted seismic survey includes a seismic source 20 (e.g., source array) that may include one or more seismic source members 22. Seismic source members 22 are illustrated as air-guns in this embodiment, which may be fired to generate acoustical waves that are reflected from the subsurface geological features back to the sensors 15 carried by seismic cable 14. Source members 22 may include any acoustical-wave generation device, including without limitations, air-guns, explosives, percussion devices and the like. In the embodiment of FIG. 1, seismic source 20 is towed by the master survey vessel 12 that is also towing seismic cable 14. Seismic source 20 may be towed by a source vessel. A survey vessel that only tows a seismic source is often referred to as a source vessel.

One or more of survey vessels 12 include a controller 24 that may have one or more processing units, electronic storage devices, electronic displays, and wired and wireless receivers and transmitters. In the embodiment depicted in FIG. 1, controller 24 includes communication device 26 to facilitate direct wireless radio frequency communication 50 between master vessel 12 and the other survey vessels, such as second survey vessel 12b. Second survey vessel 12b includes a communication device 26 and may be, for example and without limitation, a source vessel, recording vessel, service vessel, fast rescue vessels, chase vessels, streamer vessel and the like. A satellite communication link 27a may be available via satellite 27. The time delay that is common the transmission and receipt of a signal via satellite communication link 27a prevents real-time communication.

According to one or more aspects of the present disclosure, communication system 10 includes a communication hub 28 that is connected to controller 24 of vessel 12a via a wired communication link 60. Wired communication link 60 may be provided through one or more of optic fibers or electrical conductors existing. In the embodiment of FIG. 1, wired communication link 60 is provided via seismic streamer cable 14. In some embodiments, the wired communication link 60 may be a dedicated line (e.g., optic fiber, electrical conductor) that is not disposed in seismic cable 14.

Communication hub 28 includes a communication device 26, circuits for receiving and transmitting electric signals and may further include a stand-alone power source. In the embodiment of FIG. 1, communication hub 28 is disposed with a buoy 18 which is a tail buoy in the embodiment of FIG. 1. Communication hub 28 can provide wireless communication 50.

An example according to one or more aspects of communication system 10 is now described with reference to FIG. 1. In this example, vessel 12 is referred to as a master vessel. Electronic signals, including messages, data, and the like may be sent to and from master vessel 12 to one or more secondary survey vessels 12b via wireless transmissions (e.g., direct wireless link 50, satellite link 27, etc.) and/or utilizing communication hub 28. For example, master vessel 12 may send a signal to second vessel 12b causing the sources 20 towed by vessel 12b to be fired. It is necessary for time delays in the communication to be minimized if not eliminated. In many instances, the signal may be sent via a direct wireless link 50. In some instances the direct wireless communication link 50 between vessel 12 and 12b may be obstructed preventing successful communication. In these instances the signal may be sent via satellite link 27a. However, satellite links 27a commonly include an undesirable time delay. Communication system 10 provides a real-time communication link between the multiple vessels via hub 28.

The communication link provided via communication hub 28 includes transmitting the signal through via wired communication link 60 to communication hub 28 and then transmitted via wireless communication link 50 from communication hub 28 to the desired location, second vessel 12b in this example. The real-time communication link through hub 28 may be utilized as the only communication link or as a redundant or backup communication link. Real time is utilized herein to mean that there is substantially no time delay between transmission of the signal and receipt of the signal that is common to satellite communication links 27a.

Figure 2:
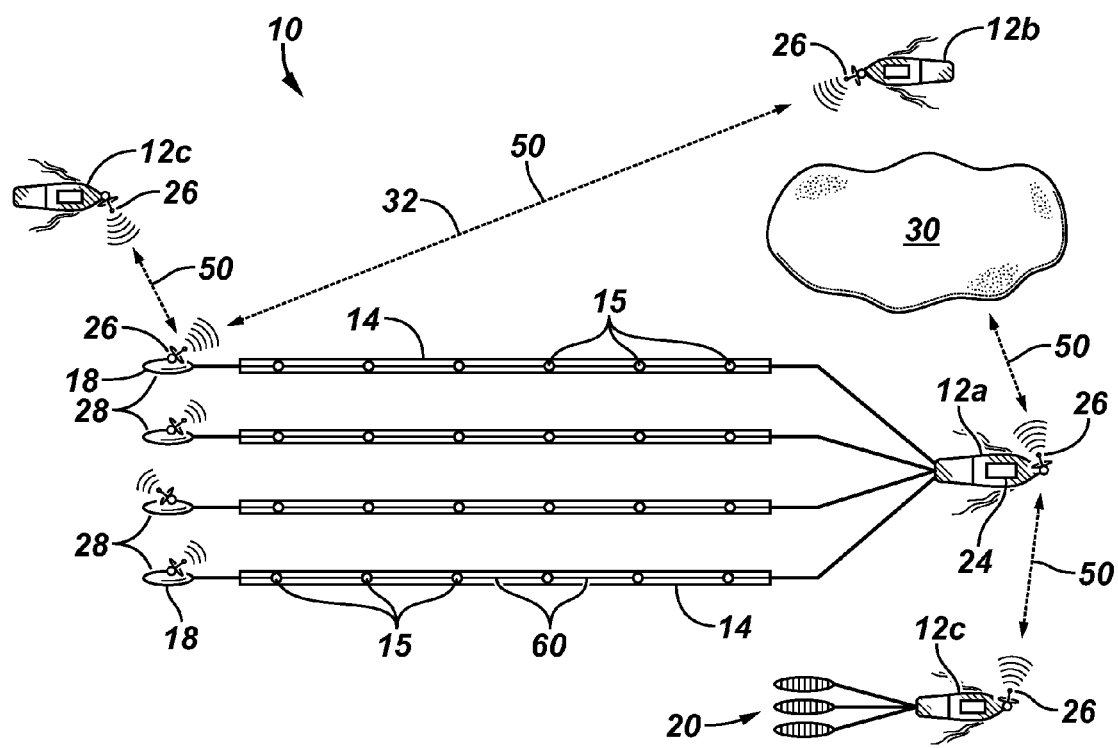
FIG. 2 is a plan view of an exemplary embodiment of a marine seismic survey according to one or more aspects of the invention.

Refer now to FIG. 2, wherein another embodiment of communication system 10 is conceptually illustrated. In this embodiment, a vessel 12a is a towing a plurality of streamer cables 14. System 10 further includes at least one communication hub 28 that is operationally and functionally connected to controller 24 of vessel 12a via a wired communication link 60. In the embodiment illustrated in FIG. 2, system 10 includes a plurality of communications hubs 28. The communication hubs 28 may be disposed at any point along streamer cables 14 including proximate to an end distal from vessel 12a. Each streamer cable 14 may include more than one communication hub 28 as well as not having any communication hubs 28. In the depicted embodiment, communication hubs 28 are depicted disposed with buoys 18. A second vessel 12b and additional vessels 12c are depicted in FIG. 2.

An obstruction 30 is depicted blocking direct wireless communication 50 between streamer vessel 12a and a second vessel 12b, designated as a fast rescue vessel in this embodiment. Obstruction 30 may include anything that blocks free sight wireless communications and/or that interferes with the successful transmission and/or receipt of a signal. Obstruction 30 may be caused for example by the curvature of the Earth.

According to one or more aspects of the present disclosure a method, for example instructions on a computer readable media, for optimizing the transmission of a signal between two points, such as vessel 12a and vessel 12b is described with reference to FIG. 2. The computer readable media may include instructions installed on controller 24. The computer readable media may detect the best signal path, depicted as path 32 in FIG. 2, for transmitting a signal in real-time between vessels. For example, system 10 of FIG. 2 includes more than one communication hub 28 as well as direct wireless communication capabilities. Controller 24, pursuant to the computer readable instructions, may test and/or determine the most reliable route for transmission of the signal. For example, obstruction 30 prevents direct wireless communication 50 between vessel 12a and 12b as well as blocks direct wireless communication from each of the communication hubs 28 except for the one indicated as path 32. Pursuant to the computer readable instructions, controller 24 transmits the signal across wired communication link 60 provided through the upper most streamer cable 14 in FIG. 2 and then wirelessly from communication hub 28 along path 32 to source vessel 12b. In some examples, additional survey vessels 12c may be available to provide additional communication relay stations between communication hub 28 and the recipient vessel.

Figure 3:
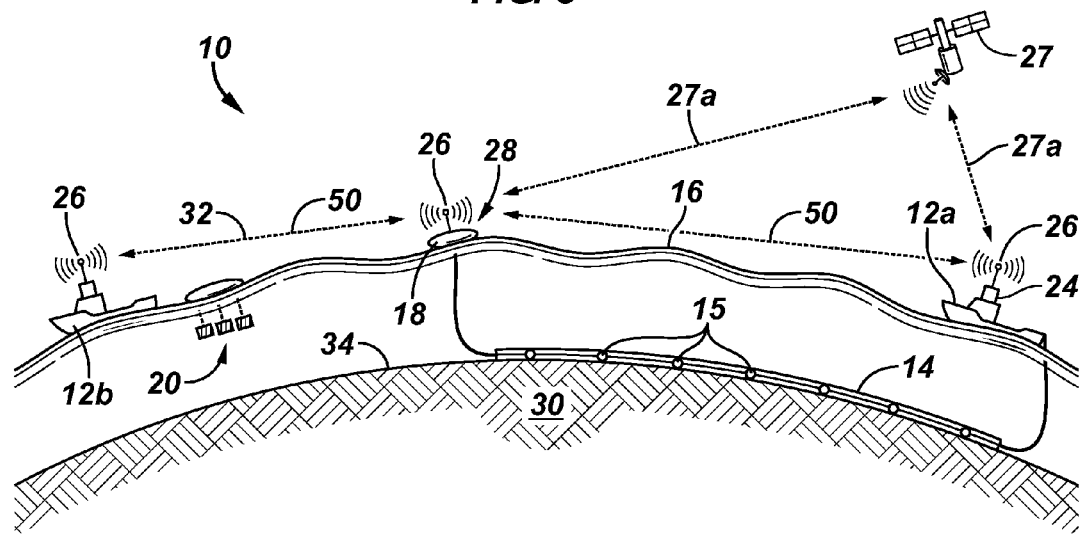
FIG. 3 is an elevation view of an exemplary embodiment of a marine seismic survey communication system according to one or more aspects of the invention.

FIG. 3 conceptually illustrates another embodiment of communication system 10 according to one or more aspects of the present disclosure. In this embodiment, seismic cable 14 is a seabed or ocean bottom cable ("OBC") that is positioned on or proximate to seabed 34. Seismic cable 14 may include one or more seismic sensors 15 (e.g., geophone, hydrophones, etc.) in communication, for example, with controller 24 of vessel 12a via cable 14. Cable 14 may be connected to vessel 12a, for example a recording vessel or other structure represented by vessel 12a that includes a controller 24.

In this embodiment, communication hub 28 is provided at buoy 18. Wired communication link 60 between hub 28 and vessel 12a is provided through seabed seismic cable 14. A second vessel 12b, depicted towing a source array 20, is the intended recipient of a signal transmitted from vessel 12a and its controller 24. An obstruction 30 (e.g., the curvature of the Earth) obstructs or interferes with a successful direct wireless communication link 50 between vessel 12a and vessel 12b. Satellite communication link 27a may provide an undesirable time-delay and/or may be obstructed by obstruction 30 for example. A best real-time communication path 32 between vessel 12a and vessel 12b may be provided via wired communication path 60 from vessel 12a and communication hub 28 and via direct wireless RF communication 50 between hub 28 and vessel 12b.

Figure 4:
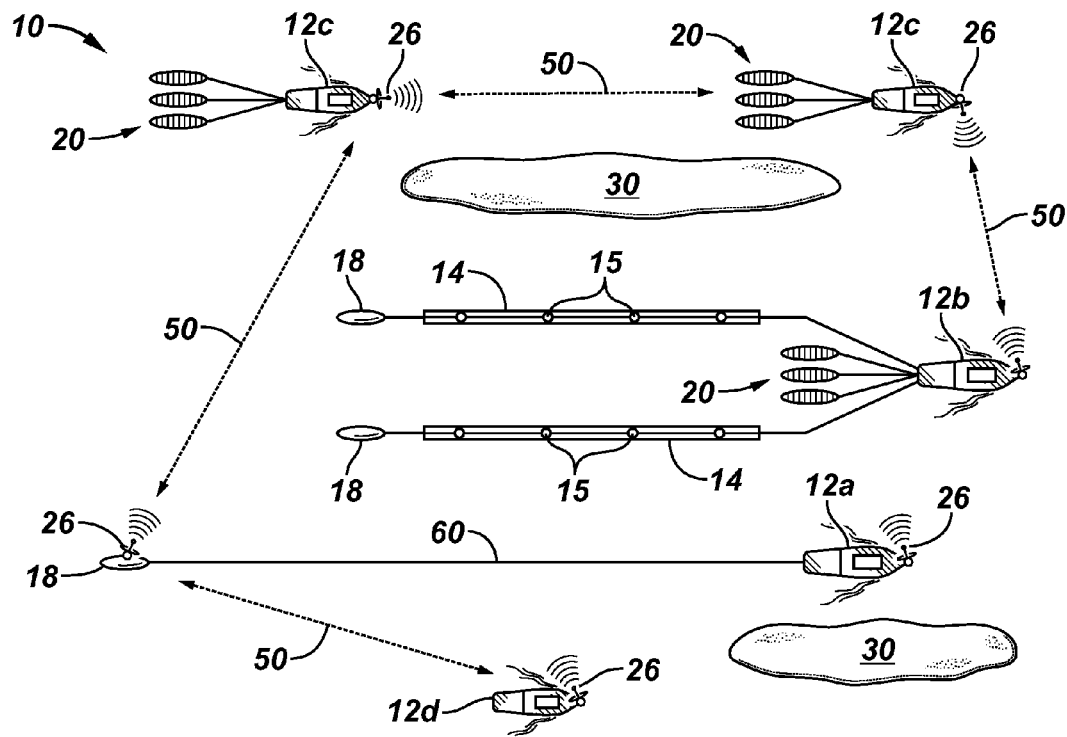
FIG. 4 is an elevation view of an exemplary embodiment of a marine seismic survey communication system according to one or more aspects of the invention.

FIG. 4 is a schematic illustration of a communication system 10 implemented in a marine seismic system according to one or more aspects of the present disclosure. FIG. 4 depicts a seismic survey comprising an array of streamer cables 14 towed behind vessel 12b, a pair of source vessels 12c each towing source arrays 20 and work vessels 12d. A survey vessel 12a tows communication hub 28 from a wired communication link 60. In this example, communication link 60 is provided through a cable dedicated to serve as a wired communication link from a vessel 12a and communication hub 28. For example, to conduct the survey vessel 12b may send control signals and the like across the survey area. As depicted, direct wired communications 50 may be blocked and/or interfered with via one or more obstructions 30. Communication system 10 facilitates real-time communication across the survey area. For example, a signal is transmitted wirelessly (e.g., radio signal) from vessel 12b. The signal may be transmitted by direct wireless communication paths 50 between vessel 12 b and the lead source vessel 12b and communication hub tow vessel 12a. The signal is received by communication device 26 of vessel 12a and relayed to communication hub 28 through wired communication link 60 where it is transmitted wirelessly view direct wireless paths 50 to the trailing source device 12c and one or more of work vessels 12d.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for communicating between marine vessels, comprising:
    connecting a communication hub and a first marine vessel via a cable;
    transmitting an electronic signal from the first marine vessel via the cable to the communication hub;
    transmitting the electronic signal wirelessly between the communication hub and a second marine vessel towing seismic sources; and
    firing the seismic sources in response to the transmitted electronic signal.

2. The method of claim 1, wherein the cable is a seismic cable comprising a seismic sensor.

3. The method of claim 2, wherein the cable is an ocean bottom cable.

4. The method of claim 1, wherein the communication hub is disposed in a buoy.

5. The method of claim 1, further comprising towing the cable from the first marine vessel.

6. The method of claim 1, wherein:
    the connecting comprises connecting a plurality of communication hubs to the first marine vessel via one or more cables;
    further comprising determining a best wireless signal path between the second marine vessel and the plurality of communication hubs; and
    the transmitting the electronic signal wirelessly between the second marine vessel and the communication hub comprises transmitting the electronic signal from the one of the plurality of communication hubs associated with the determined best wireless signal path.

7. The method of claim 1, wherein the communication hub and the first marine vessel are separated by an obstruction to wireless communication.

8. A method of communication between vessels performing a marine seismic survey, comprising:
    towing a plurality of streamer cables behind a first marine vessel, the first marine vessel including a controller;
    connecting a communication hub to the first marine vessel through at least one of the plurality of streamer cables;
    transmitting an electronic signal from the first marine vessel to a second marine vessel via the communication hub; and
    firing a seismic source towed by the second marine vessel in response to the transmitting the electronic signal.

9. The method of claim 8, wherein the transmitting the electronic signal comprises:
    transmitting the electronic signal from the controller to the communication hub via the one of the plurality of streamer cables; and
    transmitting the electronic signal wirelessly from the communication hub to the second marine vessel.

10. The method of claim 8, wherein the connecting a communication hub comprises connecting a plurality of communication hubs to the controller via wired communication links and further comprising:

determining a best wireless path provided between the plurality of communication hubs and the second marine vessel; and transmitting the electronic signal wirelessly along the selected best wireless path.

11. The method of claim 10, wherein the transmitting the electronic signal comprises:

transmitting the electronic signal from the controller to the communication hub via the one of the plurality of streamer cables; and transmitting the electronic signal wirelessly from the communication hub to the second marine vessel.

12. A method comprising:

providing a communication link between a first marine vessel towing a seismic streamer and a second marine vessel towing a seismic source, the communication link comprising a wired communication link between the first marine vessel and a communication hub located a distance away from the first marine vessel and a wireless communication link between the communication hub and the second vessel;

transmitting from the first marine vessel via the communication link an electronic signal to fire the seismic source; and firing the seismic source in response to transmitting the electronic signal via the communication link.

13. The method of claim 12, wherein the wired communication link is provided through a seismic streamer cable.

14. The method of claim 12, wherein the communication hub comprises more than one communication hub, and wherein the transmitting the electronic signal comprises determining a best wireless signal path between the second marine vessel and the more than one communication hub.

15. The method of claim 14, wherein the transmitting the electronic signal further comprises transmitting the electronic signal via the wired communication link to the communication hub and transmitting the electronic signal via the determined best wireless path from the communication hub to the second marine vessel.

16. The method of claim 15, wherein the wired communication link is provided through a seismic streamer cable.

* * * * *